No. 779,462. PATENTED JAN. 10, 1905.
N. BOSMANN.
OVERFLOW ALARM OR INDICATOR FOR REFRIGERATORS, &c.
APPLICATION FILED DEC. 3, 1903.

3 SHEETS—SHEET 1.

Witnesses:-

Inventor
Nicolas Bosmann
By Attorneys

No. 779,462. PATENTED JAN. 10, 1905.
N. BOSMANN.
OVERFLOW ALARM OR INDICATOR FOR REFRIGERATORS, &c.
APPLICATION FILED DEC. 3, 1903.
3 SHEETS—SHEET 2.
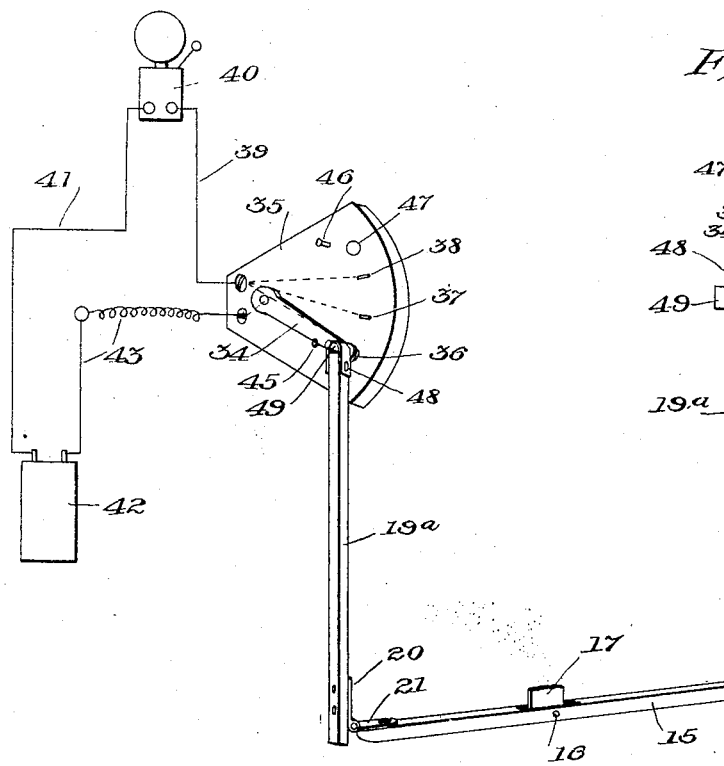
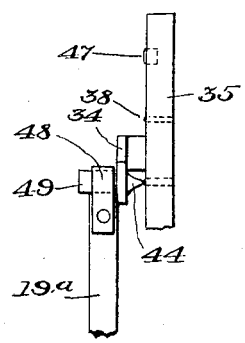
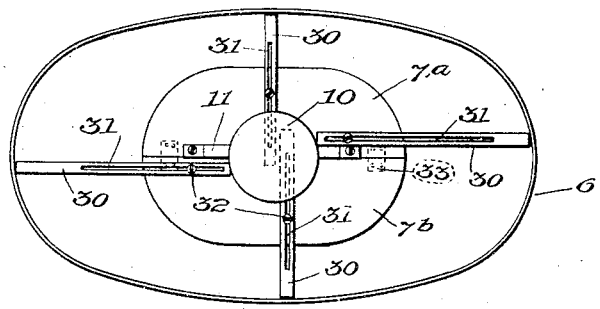
Witnesses:
M. J. McPike
Robert H. Weir
Inventor
Nicolas Bosmann
By Leavitt & Hopkins
Attorneys.

No. 779,462. PATENTED JAN. 10, 1905.
N. BOSMANN.
OVERFLOW ALARM OR INDICATOR FOR REFRIGERATORS, &c.
APPLICATION FILED DEC. 3, 1903.

3 SHEETS—SHEET 3.

Witnesses:
M. J. McPike
M. B. Allstadt

Inventor
Nicolas Bosmann
By Elliott & Hopkins
Attorneys.

No. 779,462.

Patented January 10, 1905.

UNITED STATES PATENT OFFICE.

NICOLAS BOSMANN, OF CHICAGO, ILLINOIS, ASSIGNOR TO LEO BERGER, OF CHICAGO, ILLINOIS.

OVERFLOW ALARM OR INDICATOR FOR REFRIGERATORS, &c.

SPECIFICATION forming part of Letters Patent No. 779,462, dated January 10, 1905.

Application filed December 3, 1903. Serial No. 183,548.

*To all whom it may concern:*

Be it known that I, NICOLAS BOSMANN, a citizen of the United States, residing at Chicago, in the county of Cook and State of Illinois, have invented certain new and useful Improvements in Overflow-Indicators for Refrigerators, &c., of which the following is a full, clear, and exact specification.

My invention relates to means for indicating when the drip-pan used under a refrigerator, &c., is full or so nearly full as to require emptying; and the invention has for its primary object to provide improved and simple means for that purpose.

A further object of the invention is to provide an indicator that will remind the attendant that the pan needs to be emptied as soon as the water rises to a certain level therein and will continue to thus remind the attendant until the pan is emptied.

A further object is to provide a simple form of indicator that may be readily applied to any form of refrigerator and the drip-pans already in use, and a still further object of the invention is to provide improved means for closing the drain-pipe when the drip-pan is removed.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figures 1, 2, 3:
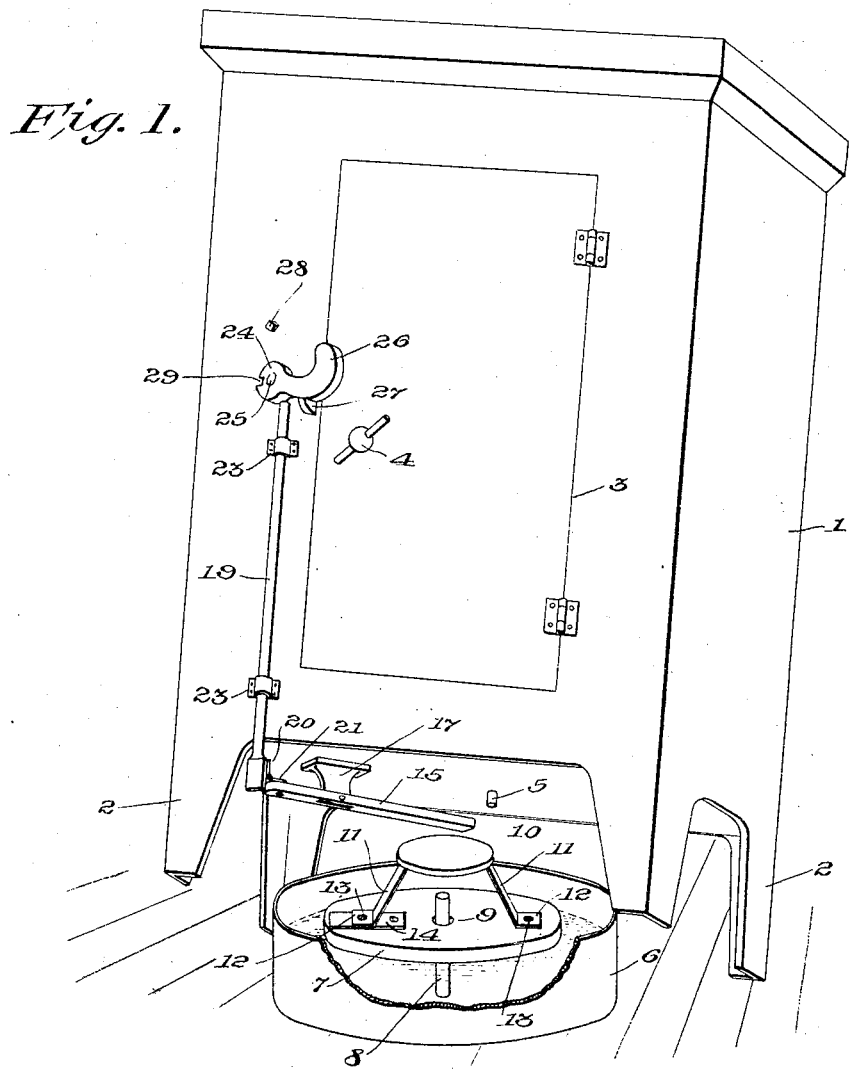
Figure 7:
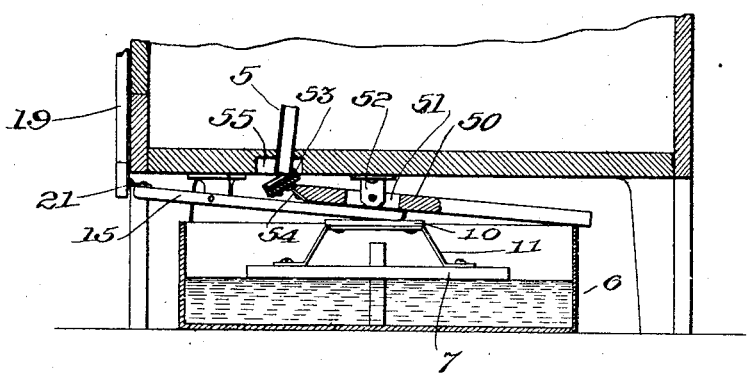
Figure 8:
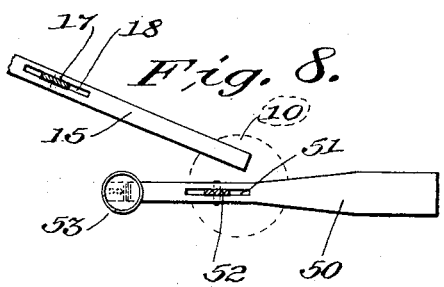

In the said drawings, Figure 1 is a perspective view of my improvements applied to a refrigerator, the refrigerator being tipped backwardly to show the mechanism underneath and a part of the drip-pan being broken away. Fig. 2 is a detail view of the lock and indicator, showing it in its proper position. Fig. 3 is an enlarged detail plan section of the horizontal lever and the upright rod which is actuated by it. Fig. 4 is a diagrammatic view, partially in perspective, of a modified form of indicator or alarm hereinafter described. Fig. 5 is an enlarged detail view of the switch and a part of the operating-rod hereinafter explained. Fig. 6 is a modified form of float, showing the same in plan view and arranged within the drip-pan. Fig. 7 is a vertical sectional view of the refrigerator, showing the same supplied with the mechanism illustrated in Figs. 1 to 4 for indicating the level of the water and an additional means for closing the drain-pipe when the pan is removed; and Fig. 8 is a plan view of the two levers, showing their relative arrangement and relation to the float.

In Fig. 1 of the drawings the device is shown as applied to the front of an ordinary refrigerator or ice-box 1, having the usual supporting-legs 2 and door 3, which latter may be provided with the usual handle 4 for operating any ordinary latch or lock of the usual or any suitable construction, (not necessary to illustrate,) and 5 is the drip-pipe, which extends through the bottom of the refrigerator for carrying off the surplus water and directing the same into the drip-pan 6, arranged below the refrigerator, as usual.

In the pan 6 is situated a float 7, which may be of any suitable form and construction; but in the example shown in Fig. 1 it is round, like the pan, and may be held central in the pan, if the pan should happen to be considerably larger than the float, by a pin or rod 8, secured in the bottom of the pan and passing upwardly through a hole 9 in the float, so that the float may rise and fall with the water without being interfered with by the pin. Supported on the float 7 is a lever-operating head 10, which is preferably connected to the float by means of a pair of legs or supports 11, one at each side, having feet 12, whereby the legs may be secured to the float by any suitable means, such as screws 13, and these legs 11 are preferably constructed of some flexible material, such as sheet metal, so that they may be bent outwardly or inwardly to alter the height of the head 10, and thereby adapt the device to refrigerators whose bottoms are located at different elevations from the floor, the screws 13 being driven into the float 7 at any desired point, and to that end the float may be composed of a material that will be suitable for that use, such as wood, cork, or other light substance, or if composed of a substance either too soft or too hard to readily admit of the screws 13 being driven into it a softer substance, such as wood, may be inserted or inlaid in the face thereof or otherwise secured to it. As an example of such an expedient I have shown a strip 14 secured to the float 7, which may be regarded as composed of cork.

Supported on the bottom of the refrigerator is a horizontal lever 15, whose free end is arranged over and adapted to be raised by the head 10 while the float 7 rises to a certain predetermined level, or, in other words, when the water in the pan rises so near the top of the pan as to make it necessary or desirable to empty it. This lever 15 is supported on a pin or fulcrum 16, which passes through a bracket or hanger 17, secured to the bottom of the refrigerator, and this hanger 17 is flat or elongated lengthwise of the lever 15, as shown in Fig. 3, and engages in a slot 18 in said lever, so as to hold the lever from twisting on the hanger 17 and confining its movement to an up-and-down movement on the pin 16. The outer end of the lever 15 is suitably connected to a vertical rod 19, preferably by means of a universal joint, which will permit of the vertical oscillation of the lever, while also allowing considerable latitude of adjustment of the rod 19 in a lateral or sidewise direction, so that it will better adapt itself to refrigerators of different sizes and proportions. This universal joint consists, preferably, of a hinge whose upper leaf 20 is secured to the lower end of the rod 19, while the lower leaf 21 is pivoted to the lever 15 by means of a pin 22. The rod 19 is supported on the outer side of the refrigerator, adjacent to the door 3, by means of suitable guides or keepers 23, which will hold the rod in an upright position, while permitting it to rise and fall freely with the lever 15, sufficient play being allowed in the keepers 23 to permit of the oscillating movement of the lever without binding the rod, and to the upper end of rod 19, which serves as a bolt or catch, is pivoted a latch or button composed of a hub 24, through which the pivot 25 passes, and a weighted head 26, adapted to project across the door 3 when in its horizontal position, and thus prevent the door from being opened. This latch is supported in its horizontal position by a stop 27 and its upward movement is limited by a second stop 28; but the weighted head overbalances it on the right-hand side as viewed in Fig. 1 and causes it to fall away from the stop 28 and lock the door when not otherwise restrained. When the water is low in the pan 6, the rod 19 is in its upper position, and consequently if the latch 26 should be raised to the position shown in Fig. 2 the rounded hub 24 will first depress the rod 19, and then the rod will spring upwardly into a notch 29, formed in the bottom of the hub, and thereby lock the latch in its upright position, as shown in Fig. 2. As soon as the water in the pan rises beyond a certain level, however, the head 10 will press lever 15 upwardly, and thereby pull the rod 19 downwardly, thus releasing the upper end of the rod from the latch and permitting the latter to fall across the edge of the door, where it will remain until returned to its normal position by the hand of the attendant; but should the attendant neglect to empty the pan the rod 19 will remain in its downward position and consequently as soon as the hand of the attendant is removed from the latch the latch will drop back again and lock the door, and in this way constitutes a continual reminder of the fact that the pan needs emptying, and the attendant will be thus reminded every time it is attempted to open the door unless the pan be first emptied.

In case the pan should be very much larger than the size of the float which it is desired to use or it should be of an oblong form and it should be necessary to have the float located either at the center or at one end the float may be provided with centering sticks or members 30, having slots 31, by which they are adjustably secured on four sides of the float by means of screws 32 or other suitable devices. Thus by pulling the sticks 30 inwardly or outwardly it will be seen that the float may be adjusted to any position in the pan. In Fig. 6 of the drawings the pan is shown of an oblong form, with the float adjusted to its center; but it will nevertheless be understood that the float may be arranged to one side of the center by pulling one of the end sticks inwardly and pushing the other outwardly. In this figure the float is shown of an oblong form; but the form of the outline is entirely immaterial, as it may be round, square, or elongated, as best suited for the shape of the pan employed. In this form, however, it is shown as composed of two halves $7^a$ $7^b$, which are secured together by hinges 33, arranged on the bottom, and the legs 11, heretofore described, are secured to one of the halves. This sectional formation of float may be desirable in some instances for greater compactness during storing or shipment.

In the modification shown in Figs. 4 and 5 is illustrated an indicator adapted to sound an alarm or bell as a substitute for locking the refrigerator-door, and this alarm is of such a character that it continues to ring until the pan is emptied, thus constituting a continual reminder to the attendant that the pan needs attention, and it is preferably so constructed as to give one or more preliminary warnings that the water in the pan is approaching the danger-level. This device consists, preferably, of an electric switch comprising a switch-arm 34, pivoted to a switch-plate 35, which may be secured to the front or other suitable part of the refrigerator in any appropriate way, and in this plate 35 are embedded a series of contacts 36 37 38, all connected to one wire 39 of an electric bell 40, which may be situated at any convenient point. The bell 40 is connected on the other side by wire 41 to one pole of a battery 42, whose other pole is connected by wire 43 with the switch-arm 34. When the level of the water rises in the pan 6, a contact-point 44 on the under side of the switch-arm 34 moves successively across the contacts 38 37 36, and with the device provided with three of such contacts it will be seen that the bell 40 will give two preliminary or warning signals before it begins to ring continually, which occurs when the switch-arm 34 arrives at the contact 36, where the arm 34 is arrested by a suitable stop 45 and where it remains until the attendant removes and empties the pan and restores the arm 34 to its normal position against a stop 46 and on a dead-button 47, thus cutting the battery out of contact. As the contacts 37 38 are traversed by the contact 44 the bell will continue to ring but a comparatively short time. The switch-arm 34 may be connected with the lever 15 in any suitable way, as by means of a rod 19$^a$, having a strap 48 on its upper end engaging over a crank-pin 49 on arm 34.

In Figs. 7 and 8 I have shown a valve mechanism which may be used in conjunction with either of the indicator mechanisms shown in Figs. 1 and 4 for closing the drain-pipe when the drip-pan is removed. This mechanism consists simply of a lever or arm 50, which is slotted at 51 for the insertion of the lower end of a supporting bracket or hanger 52, adapted to support the lever in a substantially horizontal position, with one end hanging downwardly, so as to be struck and elevated by the pan 6 when the latter is introduced under the refrigerator. The upper end of the lever 50 carries a valve 53, which is adapted to come against and close the lower end of the drip-pipe 5 when the pan 6 is removed from the lower end of the lever 50, and thus prevent the drip which occurs during the time that the pan is removed for emptying from falling upon the floor; but when the pan is in place it automatically lifts the lower end of the lever 50 and receives the drip from the pipe 5. To the end that the valve 53 may adapt itself squarely to the lower end of the pipe it is secured to the end of lever 50 by a hinge 54, which also enables the valve to tip downwardly when out of contact with the pipe, and thus direct the water into the pan and not induce it to run down the lever 50 or to the floor, the pivot of the hinge 54 being slightly to one side of the center of the valve, as shown in Fig. 7, to permit of this tipping movement. The pipe 5, if desired, may also be inclined slightly to better adapt the valve to the end thereof, and the bottom of the refrigerator around the pipe may be recessed, as shown at 55, to receive the valve, and thus provide for the valve and lever 50 being arranged very close to the bottom of the refrigerator, while leaving adequate room below for the introduction of the pan. The lower end of lever 50 may of course be weighted, if desired, in any suitable way, as by increasing its width, as shown in Fig. 8.

Having thus described my invention, what I claim as new therein, and desire to secure by Letters Patent, is—

1. In a device for the purpose described, the combination of a drip-pan, a float therein, an indicator mechanism for denoting the level of the water in the pan, a head for actuating said indicator mechanism, and flexible legs securing said head to said float and adapted to be bent outwardly or inwardly for changing the height of the head with relation to the float.

2. In a device for the purpose described, the combination of a drip-pan, a portable float therein removable therewith, an inclined lever arranged over, but disconnected from said float and adapted to be raised thereby, a refrigerator to the bottom of which said lever is secured, a rod extending upwardly and supported on said refrigerator, means connecting the lower end of said rod to one end of said lever, and an indicator mechanism operatively related to the upper end of the rod.

3. In a device for the purpose described, the combination of a drip-pan, a float therein, a laterally-projecting lever arranged over said float and having a longitudinal slot, a hanger for supporting said lever having an elongated portion pivoted in said slot so as to hold said lever against lateral movement, an upright rod, a universal joint connecting the lower end of said rod with one end of said lever, and an indicator mechanism operatively related to the upper end of said rod.

4. In a device for the purpose described, the combination of a drip-pan, a float therein, composed of two hinged sections, an indicator mechanism, and means for placing said float in operative relation to said indicator mechanism.

5. In a device for the purpose described, the combination of a drip-pan, a portable float therein, centering sticks or members adjustably secured to said float for positioning it in said pan, an indicator mechanism, and means for placing said mechanism in operative relation to said float.

6. In a device for the purpose described, the combination of a drip-pan, a refrigerator arranged thereover and having a drain, a valve for closing said drain, and means for opening said valve by the introduction of said pan.

7. In a device for the purpose described, the combination of a refrigerator having a drain, a drip-pan adapted to be arranged thereunder, a valve for closing said drain, a horizontal lever for actuating said valve, supported under the refrigerator and having its end depending in the line of movement of said pan and adapted to be struck and elevated thereby.

8. In a device for the purpose described, the combination of a drip pan or receptacle, a portable float situated therein and free to be removed therewith, an indicator for denoting the level of the water in said pan, and an inclined lever independent of said float, but actuatable thereby, having its outer end higher than the edge of the pan so as to admit the pan and float thereunder.

9. In a device for the purpose described, the combination of a door, means for locking the door, means for holding said lock out of action, a receptacle for receiving a liquid, and means actuatable by variations in the level of the liquid in said receptacle for releasing the said means for holding the lock out of action.

10. In a device for the purpose described, the combination of a door, a gravity-lock for locking the door, a catch for holding said lock against movement, a receptacle for receiving a liquid, and means actuatable by variations in the level of the liquid in said receptacle for operating said catch.

11. In a device for the purpose described, the combination of a drip-pan, a portable float arranged therein and removable therewith, means for indicating the level of the liquid in said pan, an inclined member supported over said pan, vertically deflectable by said float for causing the actuation of said indicator, and having its outer edge higher than the edge of the pan to admit the pan and float thereunder.

12. In a device for the purpose described, the combination of a drip-pan, a portable float arranged therein and removable therewith comprising a head supported on and removable with the float and adjustable vertically with relation thereto, means for indicating the level of the liquid in said pan, a member supported over said pan and being deflectable by said head for causing the actuation of said indicator, one end of said member being higher than the edge of the pan to admit the pan and float thereunder.

NICOLAS BOSMANN

Witnesses:
F. A. HOPKINS,
M. B. ALLSTADT.